US012742730B2

(12) United States Patent
Yasuda et al.

(10) Patent No.: US 12,742,730 B2
(45) Date of Patent: Sep. 22, 2026

(54) ADSORPTION EVALUATION APPARATUS AND ADSORPTION EVALUATION METHOD

(71) Applicant: HAMAMATSU PHOTONICS K.K., Hamamatsu (JP)

(72) Inventors: Takashi Yasuda, Hamamatsu (JP); Satoshi Matsumoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 148 days.

(21) Appl. No.: 18/624,313

(22) Filed: Apr. 2, 2024

(65) Prior Publication Data

US 2024/0337597 A1 Oct. 10, 2024

(30) Foreign Application Priority Data

Apr. 4, 2023 (JP) ................................ 2023-060766

(51) Int. Cl.
*G01N 21/3581* (2014.01)
*G01N 21/3577* (2014.01)

(52) U.S. Cl.
CPC ..... *G01N 21/3581* (2013.01); *G01N 21/3577* (2013.01)

(58) Field of Classification Search
CPC ........... G01N 21/3577; G01N 21/3581; G01N 21/552; G01N 21/3586; G01N 21/43
See application file for complete search history.

(56) References Cited

U.S. PATENT DOCUMENTS

2007/0229094 A1 10/2007 Kasai et al.
2007/0235718 A1 10/2007 Kasai et al.

FOREIGN PATENT DOCUMENTS

| | | | |
|---|---|---|---|
| CN | 111504941 | A | 8/2020 |
| JP | 2008-224449 | A | 9/2008 |
| JP | 2010-169658 | A | 8/2010 |
| JP | 2020-176101 | A | 10/2020 |
| JP | 2022-052306 | A | 4/2022 |

OTHER PUBLICATIONS

Hosokawa, Kenji et al., "Adsorption measurement method," The Carbon Society of Japan "TANSO", vol. 1976, No. 85, 1976, pp. 71-79.

Zhang, Wei et al., "Probing the Mechanochemistry of Metal-Organic Frameworks with Low-Frequency Vibrational Spectroscopy," J. Phys. Chem. C, 122, 48, 2018, pp. 27442-27450.

(Continued)

*Primary Examiner* — Jurie Yun
(74) *Attorney, Agent, or Firm* — Faegre Drinker Biddle & Reath LLP

(57) ABSTRACT

An adsorption evaluation apparatus includes a measurement unit and an evaluation unit. The measurement unit irradiates a porous framework being an evaluation object with a terahertz wave, and performs measurement of a refractive index or a real part of a complex permittivity of the porous framework based on the terahertz wave which interacted with the porous framework. The evaluation unit performs evaluation of adsorption of a substance on the porous framework based on the refractive index or the real part of the complex permittivity of the porous framework measured by the measurement unit.

16 Claims, 12 Drawing Sheets

(56) References Cited

OTHER PUBLICATIONS

You Borwen et al, "Terahertz volatile gas sensing by using polymer microporous membranes", Optics Express, vol. 23, No. 3, Jan. 26, 2015, p. 2048-p. 2057, XP055781233.
Tanno Takenori et al, "In Situ Observation of Gas Adsorption onto ZIF-8 Using Terahertz Waves", The Journal of Physical Chemistry C, vol. 121, No. 33, Aug. 16, 2017, p. 17921-p. 17924, XP093193957.
Xu Wendao et al, "Pesticide detection with covalent-organic-framework nanofilms at terahertz band", Biosensors and Bioelectronics vol. 209, Aug. 1, 2022, p. 114274, XP093194176.

*Fig.10*

| | Adsorption amount per 12 mg (mg) | Refractive index change Δn @ 1.43 THz | Δn per unit adsorption amount (1/mg) |
|---|---|---|---|
| Water | 5.7 | 0.28 | 0.049 |
| Hexane | 4.104 | 0.18 | 0.044 |
| Ethanol | 4.512 | 0.17 | 0.038 |

ADSORPTION EVALUATION APPARATUS AND ADSORPTION EVALUATION METHOD

CROSS-REFERENCE TO RELATED APPLICATION

This application is based upon and claims the benefit of priority from Japanese Patent Application No. 2023-060766, filed on Apr. 4, 2023, the entire contents of which are incorporated herein by reference.

TECHNICAL FIELD

The present disclosure relates to an adsorption evaluation apparatus and an adsorption evaluation method.

BACKGROUND

A porous material having a large number of pores can adsorb a substance in the pores. Compared with the natural porous material (for example, activated carbon), a porous framework, which is an artificially formed porous material, can be formed by arbitrarily designing a structure and a size of pores, and thus, it is expected to be used in various fields. Examples of the porous framework include a metal organic framework (MOF), a covalent organic framework (COF), a hydrogen-bonded organic framework (HOF), a porous aromatic framework (PAF), and the like.

The MOF is a framework in which a polymeric structure having a pore structure is formed by linking metal ions and cross-linkable organic ligands by coordinate bonds. The COF is a framework in which a polymeric structure having a pore structure is formed by linking organic molecules by covalent bonds of light elements (H, B, C, N, O). The HOF is a framework in which a polymeric structure having a pore structure is formed by linking organic molecules by hydrogen bonds. The PAF is a framework in which a polymeric structure having a pore structure is formed by linking organic molecules by coupling bonds of carbon.

Further, examples of the porous framework also include a prussian blue. The prussian blue is a compound which has been long known as a blue pigment, and is a mixed valence compound having a framework structure. The prussian blue can be an analog by selecting and using a part of constituent elements in the framework structure, and it can be artificially designed. The analog is also referred to as the prussian blue.

In these porous frameworks, a pore structure, a specific surface area, a form, and the like can be artificially designed by precisely taking coordinate bonds and the like at the time of molecular design or appropriately selecting constituent elements, and it is considered that it is possible to construct a complicated framework and express a high-order function. These porous frameworks have been actively studied as functional materials in recent years.

Examples of the field in which the porous framework is expected to be used include an environmental field (for example, reduction of gas concentration by adsorbing toxic gas, $CO_2$ gas, or the like in the pores of the porous framework), a medical field (for example, quantitative, spatial, and temporal control of drug distribution in a body by introducing the porous framework into the body with a drug adsorbed in the pores in a drug delivery system (DDS)), an energy field (for example, storage of hydrogens adsorbed in the pores of the porous framework), and the like.

When it is possible to evaluate the adsorption of the substance on the porous framework, it is possible to confirm utilization situation of the porous framework, improve utilization form and structure of the porous framework, and the like.

A specific surface area/pore distribution measurement by a gas adsorption method is known as a technique for evaluating the adsorption of the substance on the porous material (Patent Document 1, Non Patent Document 1). In this technique, the porous material is placed in a constant temperature environment, gas molecules whose adsorption occupied area is known are adsorbed onto the porous material, and the specific surface area of the porous material is obtained from a gas adsorption amount, or the pore distribution of the porous material is measured from condensation of the gas molecules.

From the change of gas pressure, completion of the adsorption of the gas molecules onto the porous material can be detected, and the adsorption amount of the gas molecules can be obtained. However, in this technique, it is not easy to perform evaluation of the adsorption phenomenon in a steady state, evaluation of the adsorption phenomenon in a liquid, and real time evaluation of a progress process of the adsorption phenomenon.

Further, an evaluation technique using a terahertz wave is also known as a technique for evaluating the adsorption of the substance on the porous material (Patent Document 2, Non Patent Document 2). In the adsorption evaluation technique described in these documents, an absorption coefficient of the porous framework is measured in a band of the terahertz wave by utilizing the fact that the absorption coefficient of the porous framework changes by the adsorption of the substance onto the porous framework which is a porous material, and the adsorption phenomenon of the substance on the porous framework is evaluated based on the measured absorption coefficient.

The adsorption evaluation technique using the terahertz wave is expected to solve the problems of the specific surface area/pore distribution measurement technique by the gas adsorption method described above.

Patent Document 1: Japanese Patent Application Laid-Open Publication No. 2020-176101

Patent Document 2: Japanese Patent Application Laid-Open Publication No. 2010-169658

Patent Document 3: Japanese Patent Application Laid-Open Publication No. 2008-224449

Patent Document 4: Japanese Patent Application Laid-Open Publication No. 2022-052306

Non Patent Document 1: Kenji Hosokawa et al., "Adsorption measurement method", The Carbon Society of Japan "TANSO", Vol. 1976 No. 85, pp. 71-79 (1976)

Non Patent Document 2: Wei Zhang et al., "Probing the Mechanochemistry of Metal-Organic Frameworks with Low-Frequency Vibrational Spectroscopy", J. Phys. Chem. C, 122, 48, pp. 27442-27450 (2018)

SUMMARY

In studying the adsorption evaluation technique using the terahertz wave, the present inventors have found that the conventional technique has the following problem. That is, the conventional adsorption evaluation technique using the terahertz wave measures the absorption coefficient of the porous framework in the band of the terahertz wave in order to evaluate the adsorption phenomenon of the substance onto the porous framework.

In a certain type of porous framework, presence of an absorption peak near a wavelength of 1.9 THz is observed in a state in which the substance is not adsorbed, and further, the absorption peak near the wavelength of 1.9 THz disappears and a new absorption peak appears at another wavelength in a state in which the substance is adsorbed. Therefore, it is expected that the adsorption phenomenon of the substance can be evaluated based on the measured value of the absorption coefficient by utilizing the above fact.

However, another type of porous framework does not always exhibit an absorption peak within a measurable frequency range, and further, does not always exhibit clear shift of the absorption peak. Therefore, there is a problem that presence or absence, a weight, a type, and the like of the adsorption cannot be determined for the porous frameworks with various types only by the value of the absorption coefficient or the absorption spectrum.

The present invention has been made based on the findings of the present inventors described above, and an object thereof is to provide an apparatus and a method capable of more accurately evaluating an adsorption phenomenon of a substance onto a porous framework.

An embodiment of the present invention is an adsorption evaluation apparatus. The adsorption evaluation apparatus is an apparatus for evaluating adsorption of a substance on a porous framework, and includes (1) a measurement unit for irradiating the porous framework with a terahertz wave, and performing measurement of a refractive index or a real part of a complex permittivity of the porous framework based on the terahertz wave which interacted with the porous framework; and (2) an evaluation unit for performing evaluation of the adsorption of the substance on the porous framework based on the refractive index or the real part of the complex permittivity of the porous framework measured by the measurement unit.

An embodiment of the present invention is an adsorption evaluation method. The adsorption evaluation method is a method for evaluating adsorption of a substance on a porous framework, and includes (1) a measurement step of irradiating the porous framework with a terahertz wave, and performing measurement of a refractive index or a real part of a complex permittivity of the porous framework based on the terahertz wave which interacted with the porous framework; and (2) an evaluation step of performing evaluation of the adsorption of the substance on the porous framework based on the refractive index or the real part of the complex permittivity of the porous framework measured in the measurement step.

According to the embodiments of the present invention, it is possible to more accurately evaluate an adsorption phenomenon of a substance on a porous framework.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 10 is a table showing a substance adsorption amount per 12 mg of MOF-74 (Zn), a refractive index change amount at a wavelength of 1.43 THz, and a refractive index change amount per unit adsorption amount.

DETAILED DESCRIPTION

Hereinafter, embodiments of an adsorption evaluation apparatus and an adsorption evaluation method will be described in detail with reference to the accompanying drawings. In the description of the drawings, the same elements will be denoted by the same reference signs, and redundant description will be omitted. The present invention is not limited to these examples.

An adsorption evaluation apparatus and an adsorption evaluation method according to the present embodiment is an apparatus and a method for evaluating adsorption of a substance on a porous framework. Examples of the porous framework which is a host molecule include a metal organic framework (MOF), a covalent organic framework (COF), a hydrogen-bonded organic framework (HOF), a porous aromatic framework (PAF), a prussian blue, and the like. The substance which is a guest molecule is any one which can be adsorbed onto the porous framework.

The adsorption means that the substance is retained in pores on a surface and inside of the porous framework, basket-shaped or lattice-shaped portions, and the like. A state in which the substance is retained on the porous framework may be referred to as inclusion or clathrate, and a state in which the substance is incorporated into the porous framework may be referred to as clathrate compound or clathrate, and hereinafter, retaining of the substance on the porous framework is referred to as the adsorption.

The adsorption evaluation apparatus and the adsorption evaluation method of the present embodiment can not only evaluate a state in which the substance is adsorbed on the porous framework but also evaluate a change in the adsorption state of the substance on the porous framework (progress of adsorption or progress of desorption).

Figure 1:
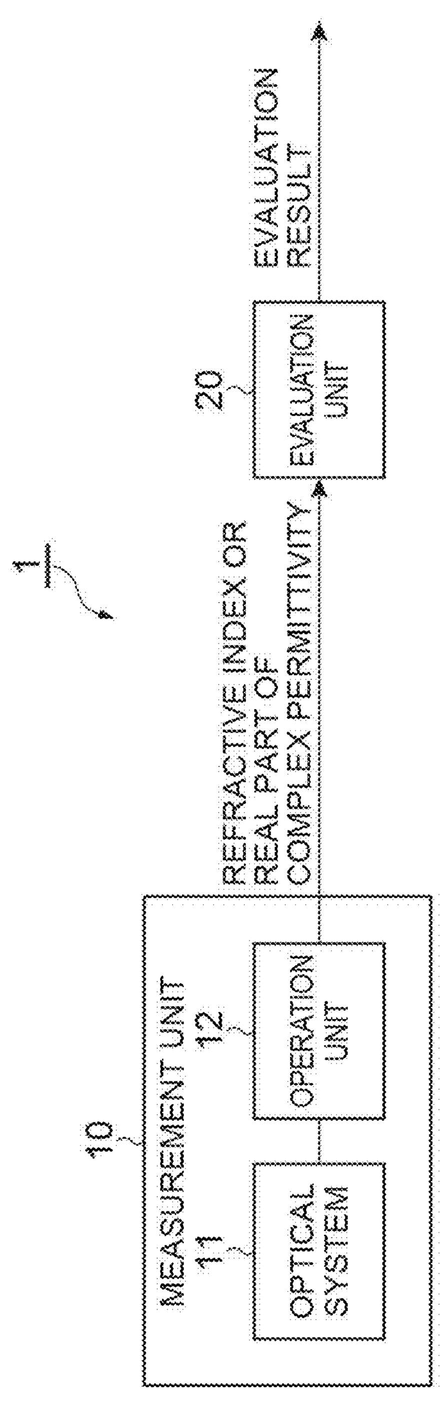
FIG. 1 is a diagram illustrating a configuration of an adsorption evaluation apparatus 1.
Figure 2:
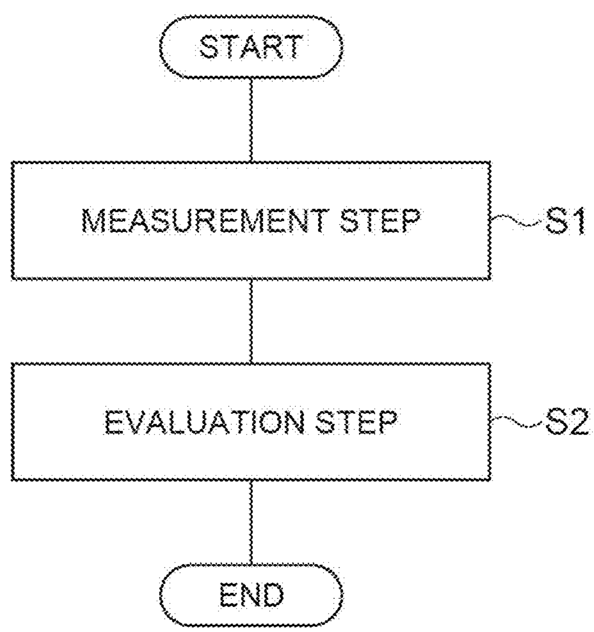
FIG. 2 is a flowchart of an adsorption evaluation method.

FIG. 1 is a diagram illustrating a configuration of an adsorption evaluation apparatus 1. The adsorption evaluation apparatus 1 includes a measurement unit 10 and an evaluation unit 20. FIG. 2 is a flowchart illustrating an adsorption evaluation method. The adsorption evaluation method includes a measurement step S1 and an evaluation step S2.

In the measurement step S1, the measurement unit 10 irradiates a porous framework being an evaluation object with a terahertz wave, and performs measurement of a refractive index or a real part of a complex permittivity of the porous framework based on the terahertz wave which interacted with the porous framework. The interaction may be any of transmission of the terahertz wave through the porous framework, reflection of the terahertz wave by the porous framework, and total reflection of the terahertz wave by the porous framework. The terahertz wave after interacting with the porous framework has information on the refractive index or the real part of the complex permittivity of the porous framework.

The measurement unit 10 includes an optical system 11 and an operation unit 12. The optical system 11 includes an optical system of the terahertz wave from a generation source for generating the terahertz wave with which the porous framework is to be irradiated to a detection unit for detecting the terahertz wave after interacting with the porous framework. The operation unit 12 performs an operation based on the detection result of the terahertz wave by the detection unit to obtain the refractive index or the real part of the complex permittivity of the porous framework.

The optical system 11 may have any configuration as long as the refractive index or the real part of the complex permittivity of the porous framework can be obtained. The refractive index or the real part of the complex permittivity of the porous framework may be obtained at one certain wavelength, may be obtained at each of a plurality of wavelengths, or further, may be obtained as a spectrum in a certain wavelength range.

In the evaluation step S2, the evaluation unit 20 performs evaluation of adsorption of the substance on the porous framework based on the refractive index or the real part of the complex permittivity of the porous framework which is measured by the measurement unit 10. The evaluation item may be any one of presence or absence, a type, and an amount of the substance adsorbed on the porous framework, or may be two or more of these.

The operation unit 12 and the evaluation unit 20 can be configured by a computer including a processing unit (for example, a CPU) for performing calculation and evaluation, a storage unit (for example, a RAM, a hard disk drive) for storing programs for performing the calculation and the evaluation and various data, an input unit (for example, a keyboard, a mouse) for receiving input of measurement conditions, evaluation items, and the like, and a display unit (for example, a liquid crystal display) for displaying evaluation results and the like, and the like.

Figure 3:
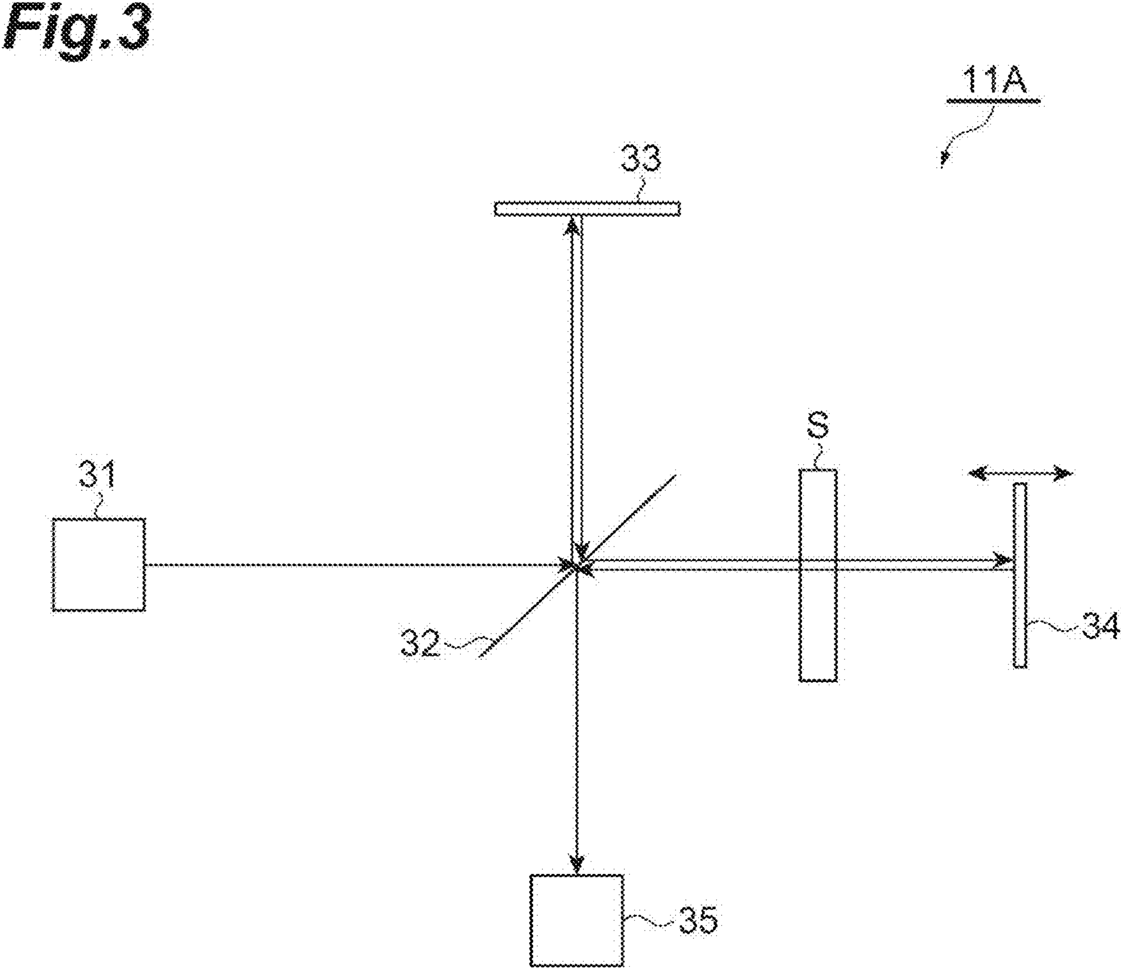
FIG. 3 is a diagram illustrating a configuration example of an optical system 11.

FIG. 3 is a diagram illustrating a configuration example of the optical system 11. An optical system 11A of the configuration example illustrated in this diagram includes a light source 31, a beam splitter 32, a mirror 33, a mirror 34, and a detector 35, and has a configuration of a Michelson interferometer. The light source 31 outputs a single wavelength (narrow band) terahertz wave.

The beam splitter 32 splits the terahertz wave output from the light source 31 into a first split terahertz wave and a second split terahertz wave, outputs the first split terahertz wave to the mirror 33, and outputs the second split terahertz wave to the mirror 34. Further, the beam splitter 32 inputs the first split terahertz wave reflected by the mirror 33, inputs the second split terahertz wave reflected by the mirror 34, and combines the first split terahertz wave and the second split terahertz wave to output the combined wave to the detector 35.

The detector 35 receives the first split terahertz wave and the second split terahertz wave combined and output by the beam splitter 32, and detects an intensity of interference between the first split terahertz wave and the second split terahertz wave.

The porous framework S, which is an evaluation object, is disposed on an optical path between one of the mirror 33 and the mirror 34 (the mirror 34 in the diagram) and the beam splitter 32. Both or one of the mirror 33 and the mirror 34 is movable in a direction perpendicular to a reflection surface.

The interference intensity detected by the detector 35 depends on a difference between respective optical path lengths of the first split terahertz wave and the second split terahertz wave from splitting to combining at the beam splitter 32. Further, the optical path length of the second split terahertz wave depends on the refractive index of the porous framework S disposed on the optical path of the second split terahertz wave. Therefore, the refractive index of the porous framework S can be measured from a change of the interference intensity caused by the movement of the mirror 34.

In addition, the optical system illustrated in FIG. 3 has the configuration of the Michelson interferometer, and further, the optical system may have a configuration of a Mach-Zehnder interferometer. Further, the optical system illustrated in FIG. 3 is an optical system for detecting the interference intensity between the second split terahertz wave transmitted through the porous framework S and the first split terahertz wave, and further, it is also possible to detect the interference intensity between the second split terahertz wave reflected by the porous framework S and the first split terahertz wave to measure the refractive index of the porous framework S from a change of the interference intensity caused by the change of the optical path difference.

Figure 4:
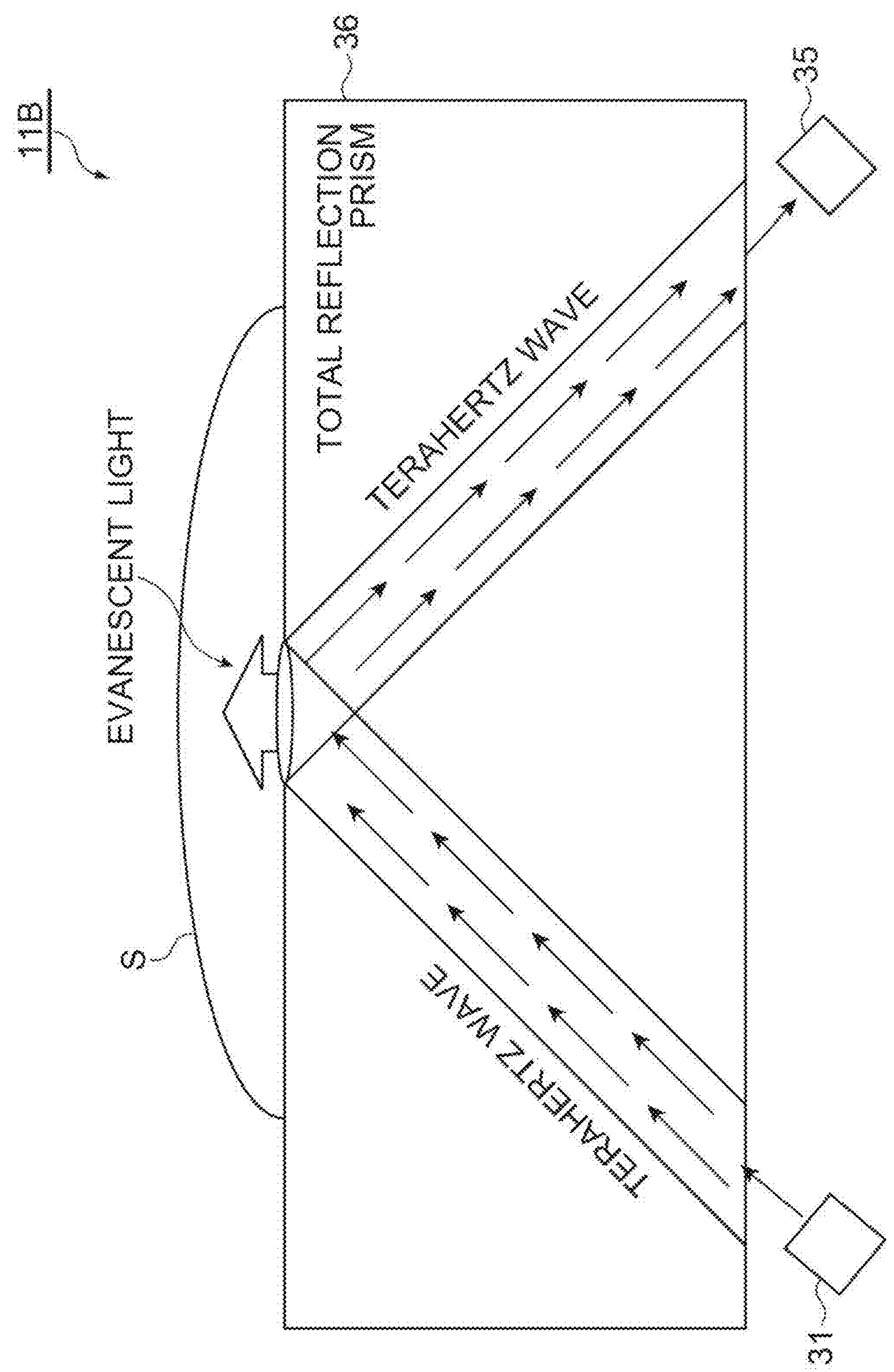
FIG. 4 is a diagram illustrating another configuration example of the optical system 11.

FIG. 4 is a diagram illustrating another configuration example of the optical system 11. An optical system 11B of the configuration example illustrated in this diagram includes a total reflection prism 36 in addition to the light source 31 and the detector 35, and measures the refractive index of the porous framework S by using attenuated total reflection (ATR) spectroscopy.

The porous framework S, which is an evaluation object, is disposed to be in contact with a surface of the total reflection prism 36. The terahertz wave output from the light source 31 passes through the inside of the total reflection prism 36, and then, reaches a boundary surface between the total reflection prism 36 and the porous framework S, and is totally reflected on the boundary surface. In this case, evanescent light of the terahertz wave enters the inside of the porous framework S.

The terahertz wave totally reflected by the boundary surface is detected by the detector 35 after passing through the inside of the total reflection prism 36. The terahertz wave totally reflected by the boundary surface has information on the refractive index of the porous framework S, and thus, the refractive index of the porous framework S can be obtained from the detection result by the detector 35.

In addition, more specifically, a configuration in which time domain spectroscopy (TDS) is used in addition to the ATR is preferable (see Patent Document 3). Further, in order to perform measurement with high reproducibility in the ATR, it is important that the total reflection prism 36 and the porous framework S are in close contact with each other, and there is no gap therebetween. Therefore, it is preferable to use a jig for pressing the porous framework S against the surface of the total reflection prism 36 (see Patent Document 4).

The configuration of the measurement unit 10 (the optical system 11 and the operation unit 12) for performing the measurement of the refractive index or the real part of the complex permittivity of the porous framework may have various other configurations. The configuration of the evaluation unit 20 for performing the evaluation of the adsorption of the substance on the porous framework based on the refractive index or the real part of the complex permittivity of the porous framework may also have various other configurations.

For example, the refractive index of the porous framework may be measured by using a critical angle method (Abbe method). The refractive index of the porous framework may be measured by using ellipsometry or the like. Further, the refractive index or the real part of the complex permittivity of the porous framework may be measured by using time domain spectroscopy (TDS).

Figure 5:
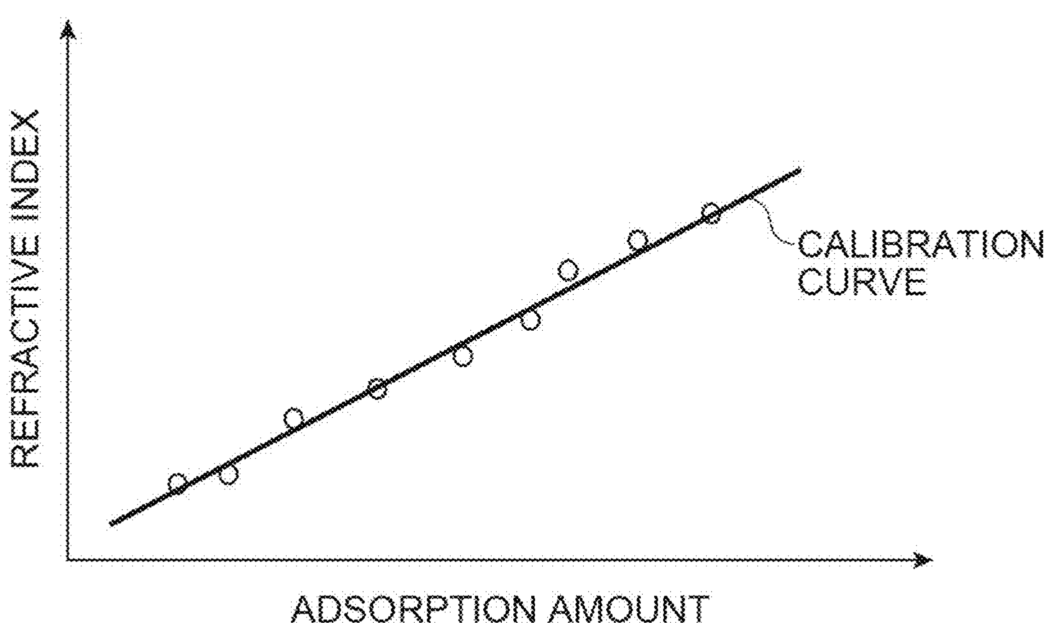
FIG. 5 is a diagram showing a calibration curve indicating a relationship between an adsorption amount of a substance on a porous framework and a refractive index of the porous framework.

The refractive index may be measured in advance when the adsorption amount of the substance in the porous framework is set to each of various values, a calibration curve (FIG. 5) representing a relationship between the adsorption amount of the substance in the porous framework and the refractive index of the porous framework may be prepared, and the adsorption amount of the substance on the porous framework may be obtained from the measured refractive index using the calibration curve. FIG. 5 is a diagram showing the calibration curve indicating the relationship between the adsorption amount of the substance on the porous framework and the refractive index of the porous framework.

The adsorption of the substance on the porous framework may be evaluated from the refractive index of the porous framework by using machine learning. For example, the refractive index of the porous framework is measured by setting various conditions for the type of the porous framework, the type of the substance, the adsorption amount of the substance, and the like, and a machine learning unit is trained using the above conditions and the measured values of the refractive index as teaching data. The trained machine learning unit is used to estimate the type of the porous framework, the type of the substance, and the adsorption amount of the substance, and the like from the measured refractive index of the porous framework.

The measurement of the refractive index or the real part of the complex permittivity of the porous framework and the evaluation of the adsorption of the substance on the porous framework based on the measurement result may be performed for one portion of the porous framework, or may be performed for each of a plurality of portions of the porous framework.

In the latter case, the measurement and the evaluation can be performed for each irradiation portion on the porous framework by scanning incident position of the terahertz wave on the porous framework. In addition, the measurement and the evaluation can be performed in a certain irradiation range on the porous framework by simultaneously irradiating the irradiation range with the terahertz wave. As described above, by performing the measurement and the evaluation for each of the plurality of portions of the porous framework, a substance adsorption distribution on the porous framework can be evaluated.

In the measurement step, the measurement may be performed at each of a plurality of measurement timings in a change process (progress of adsorption or progress of desorption) of the adsorption of the substance on the porous framework, and in the evaluation step, the evaluation of the adsorption may be performed based on the measurement result at each of the plurality of measurement timings. In this case, the evaluation of a temporal change of the adsorption of the substance on the porous framework may be performed.

Figure 6:
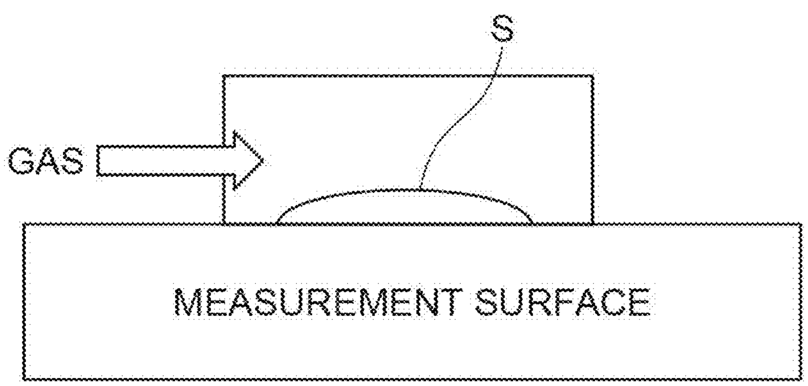
FIG. 6 is a diagram illustrating a configuration example in which measurement is performed in a state in which the porous framework is disposed in an environment containing the substance.

Further, in the measurement step, the measurement may be performed at each of the plurality of measurement timings in the change process of the adsorption of the substance on the porous framework in a state in which the porous framework is disposed in an environment containing the substance (FIG. 6). Further, in the measurement step, the measurement may be performed in a state in which the porous framework is immersed in a liquid sample obtained by dispersing or dissolving the substance in a liquid medium (FIG. 7).

FIG. 6 is a diagram illustrating a configuration example in which the measurement is performed in a state in which the porous framework is disposed in the environment containing the substance. In the configuration example illustrated in this diagram, the porous framework S, which is an evaluation object, is disposed in a closed space formed on a measurement surface, and a gas to be adsorbed on the porous framework S is introduced into the closed space. By measuring the refractive index of the porous framework S while introducing the gas, it is possible to evaluate the degree of increase of the gas adsorption amount onto the porous framework S from the temporal change of the refractive index of the porous framework S.

Figure 7:
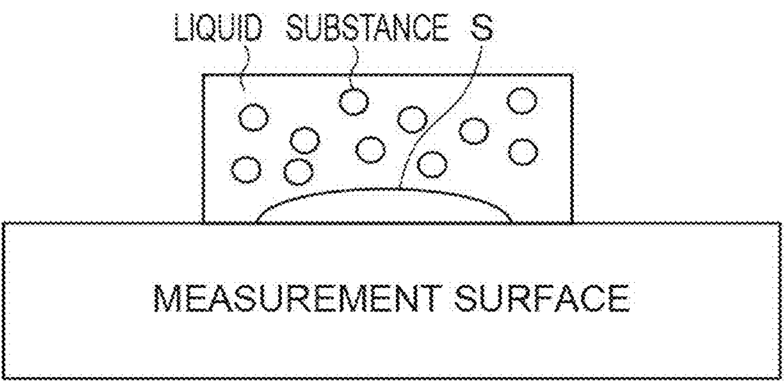
FIG. 7 is a diagram illustrating a configuration example in which measurement is performed in a state in which the porous framework is immersed in a liquid sample obtained by dispersing or dissolving the substance in a liquid medium.

FIG. 7 is a diagram illustrating a configuration example in which the measurement is performed in a state in which the porous framework is immersed in the liquid sample obtained by dispersing or dissolving the substance in the liquid medium. In the configuration example illustrated in this diagram, the porous framework S, which is an evaluation object, is disposed on a measurement surface, and the porous framework S is covered with the liquid sample in which the substance is dispersed or dissolved in the liquid medium. Even in the above configuration, the refractive index of the porous framework can be measured, and the adsorption of the substance on the porous framework S can be evaluated. In addition, absorption of the terahertz wave in the liquid is large, and thus, it is preferable to measure the refractive index of the porous framework S by the ATR.

Next, an example will be described. In the present example, MOF-74 (Zn) was used as the porous framework. MOF-74 (Zn) is the metal organic framework having a pore structure of a honeycomb structure by linking benzene rings as cross-linkable organic ligands and Zn ions by coordinate bonds. This MOF-74 (Zn) was vacuum heated to be in a state in which the substance was not adsorbed.

Further, water, hexane, and ethanol were respectively adsorbed onto MOF-74 (Zn). In each of the above four states (no adsorption, adsorption of water, adsorption of hexane, and adsorption of ethanol), the refractive index, the absorption coefficient, the real part of the complex permittivity, and the imaginary part of the complex permittivity of MOF-74 (Zn) were measured in a wavelength range of 0.5 THz to 6.5 THz.

Figure 8:
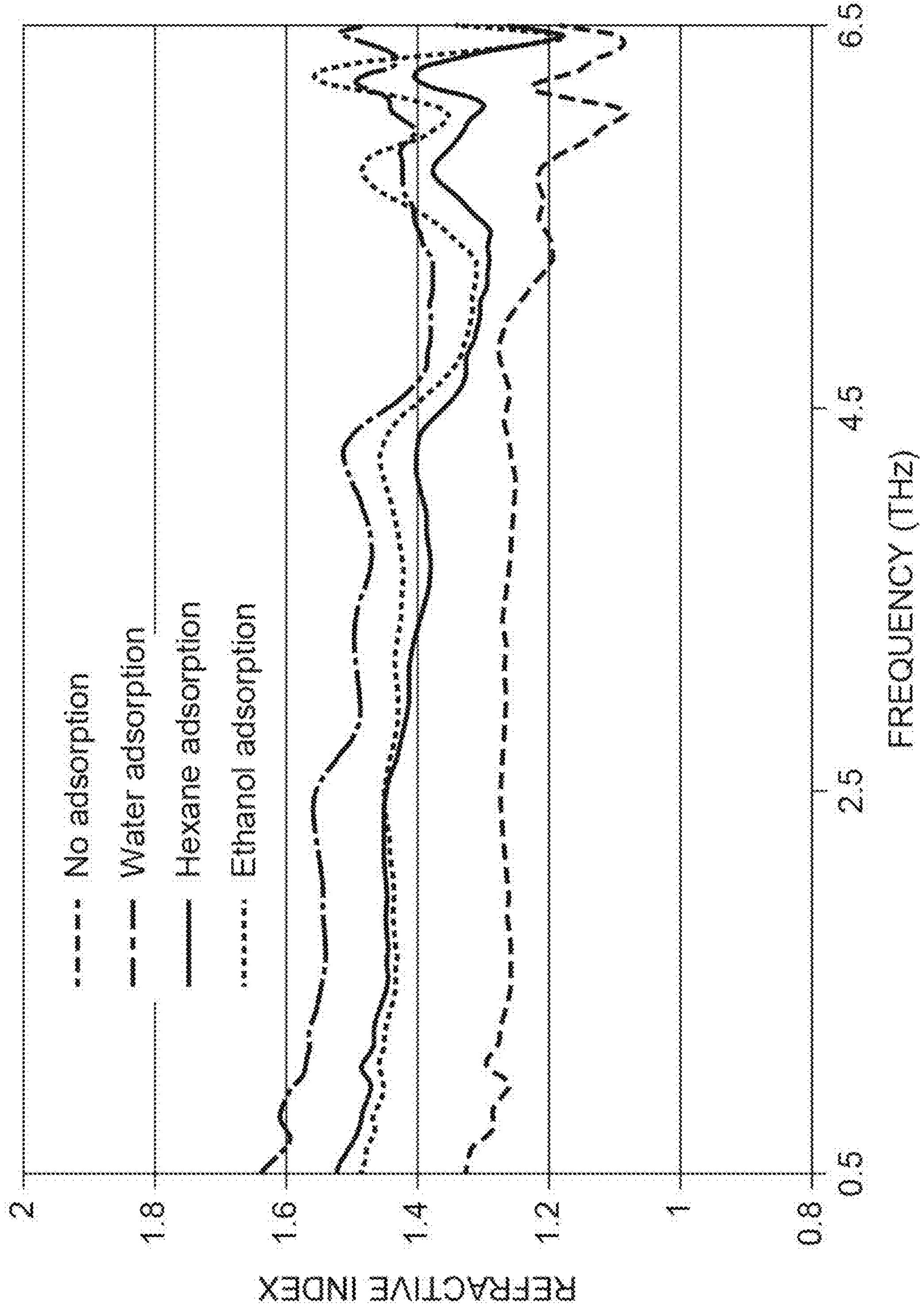
FIG. 8 is a graph showing wavelength dependency of a refractive index of MOF-74 (Zn).
Figure 9:
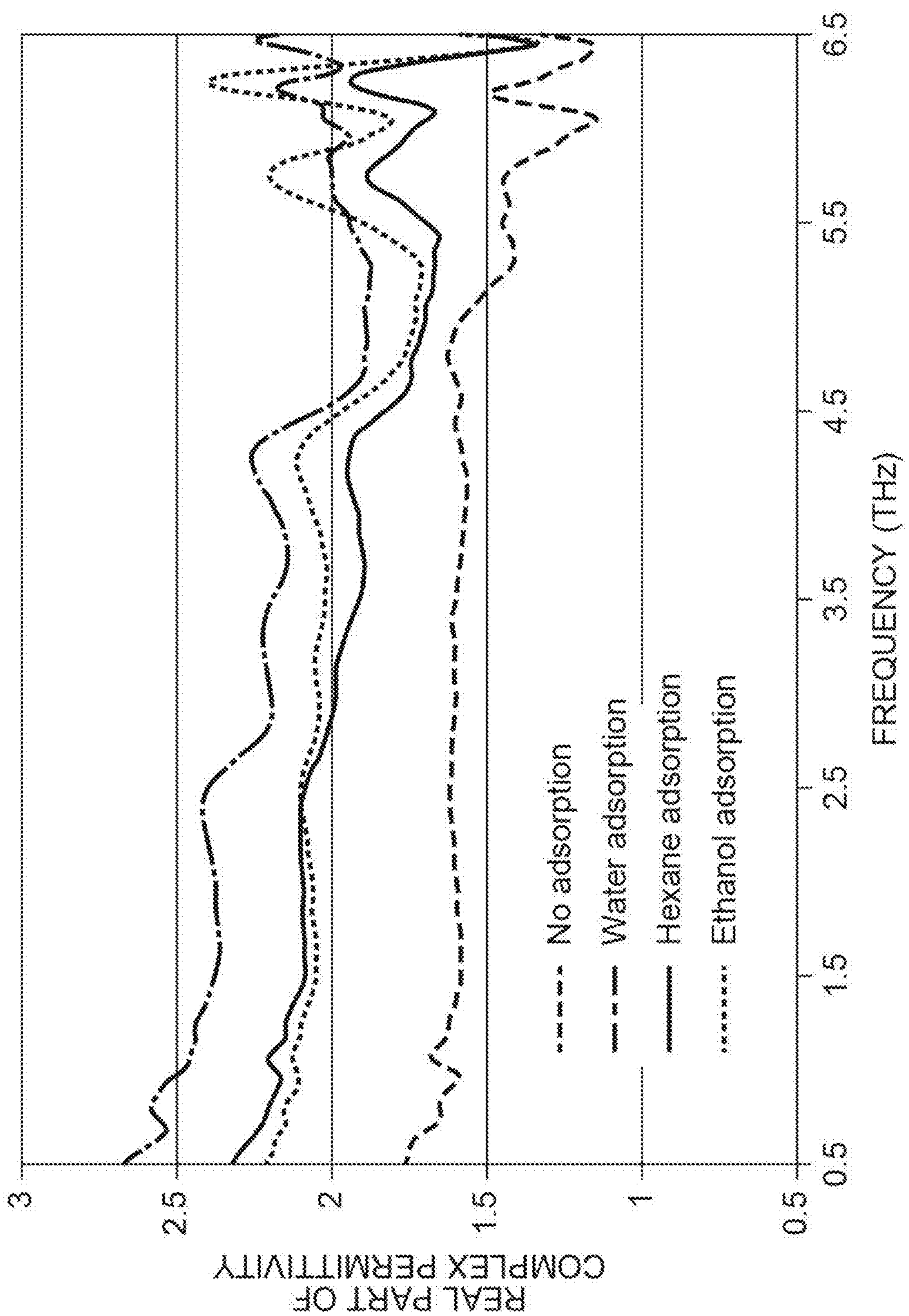
FIG. 9 is a graph showing wavelength dependency of a real part of a complex permittivity of MOF-74 (Zn).

FIG. 8 is a graph showing the wavelength dependency of the refractive index of MOF-74 (Zn). FIG. 9 is a graph showing the wavelength dependency of the real part of the complex permittivity of MOF-74 (Zn). FIG. 10 is a table showing the substance adsorption amount per 12 mg of MOF-74 (Zn), the refractive index change amount at a wavelength of 1.43 THz, and the refractive index change amount per unit adsorption amount.

The refractive index and the real part of the complex permittivity have the similar wavelength dependencies. That is, the evaluation of the adsorption of the substance on the porous framework is possible not only from the refractive index but also from the real part of the complex permittivity.

The value of the refractive index or the real part of the complex permittivity of the porous framework changes depending on presence or absence of the adsorption of the substance onto the porous framework. The change amount of the value of the refractive index or the real part of the complex permittivity of the porous framework differs depending on the amount of the adsorption of the substance onto the porous framework. The wavelength dependency of the refractive index or the real part of the complex permittivity of the porous framework differs depending on the type of the substance adsorbed onto the porous framework.

When the relationship between the substance absorption and the refractive index change was examined using other types of the porous frameworks, it was confirmed that, in any porous framework, the refractive index changed depending on presence or absence of the adsorption, the type of the adsorbed substance, and the amount of the adsorbed substance.

Figure 11:
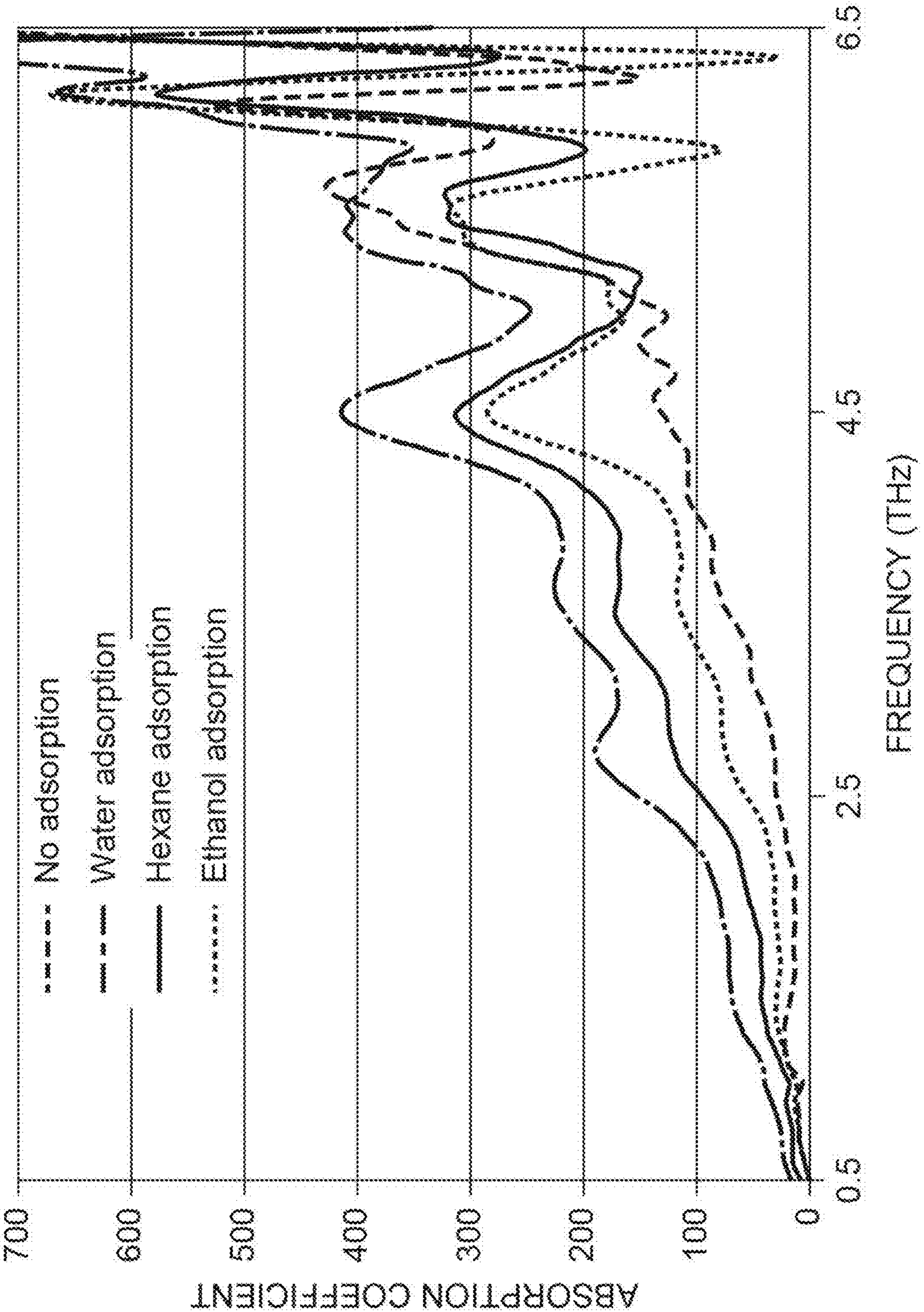
FIG. 11 is a graph showing wavelength dependency of an absorption coefficient of MOF-74 (Zn).
Figure 12:
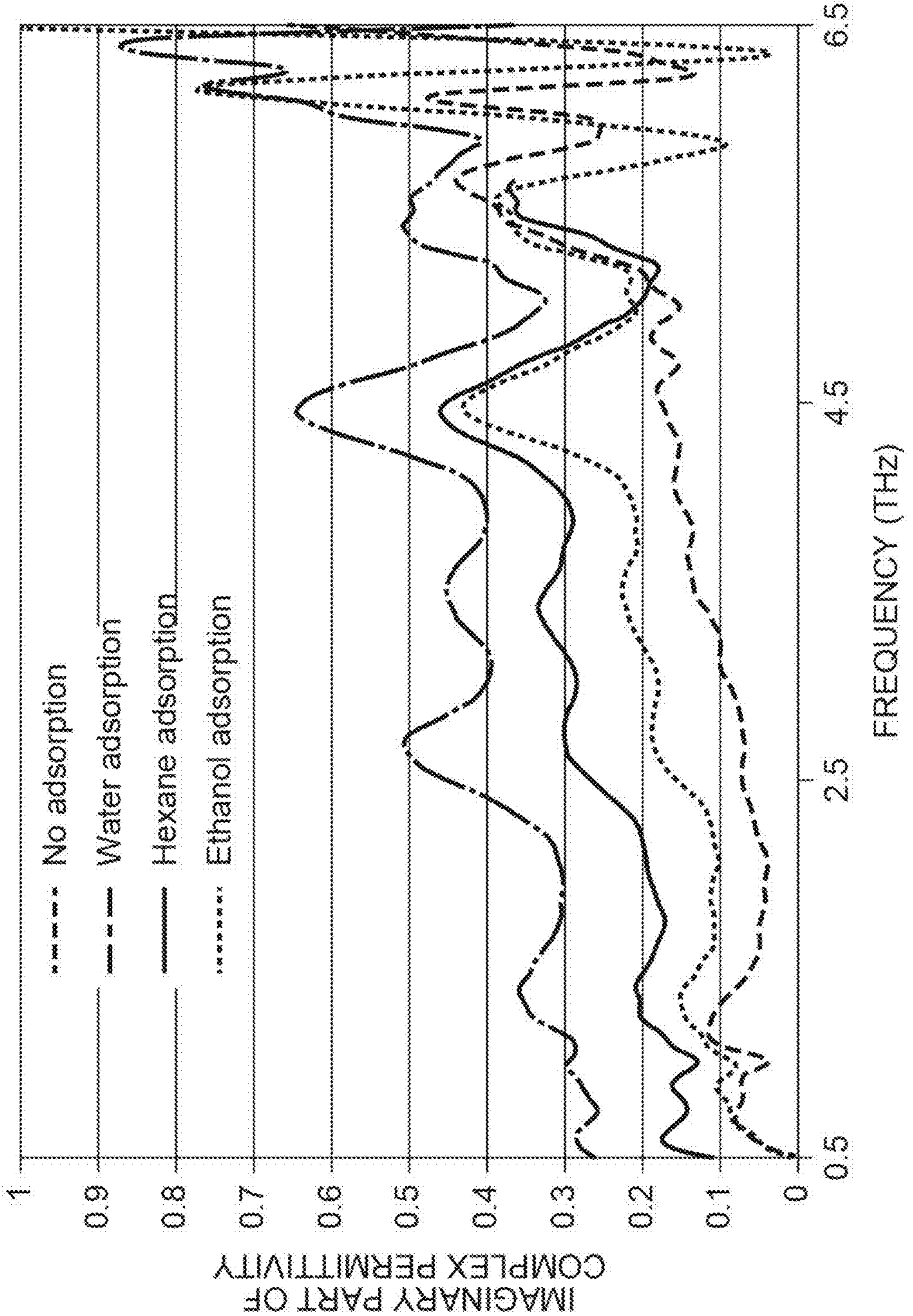
FIG. 12 is a graph showing wavelength dependency of an imaginary part of a complex permittivity of MOF-74 (Zn).

FIG. 11 is a graph showing the wavelength dependency of the absorption coefficient of MOF-74 (Zn). FIG. 12 is a graph showing the wavelength dependency of the imaginary part of the complex permittivity of MOF-74 (Zn). It can be seen that the absorption spectrum changes due to the adsorption. It can be also seen that the absorption peak wavelength differs depending on the type of the adsorbed substance.

However, in a certain type of porous framework, the absorption peak does not always appear within a measurable frequency range, and further, a clear shift of the absorption peak also does not always appear. Therefore, presence or absence, a weight, a type, and the like of the adsorption cannot be determined for the porous frameworks with various types only by using the value of the absorption coefficient or the absorption spectrum.

In addition, in the measurement step, the measurement of the absorption coefficient or the imaginary part of the complex permittivity of the porous framework may be performed in addition to the measurement of the refractive index or the real part of the complex permittivity of the porous framework based on the terahertz wave which interacted with the porous framework. In this case, in the evaluation step, the evaluation of the adsorption of the substance on the porous framework can be performed based on the absorption coefficient or the imaginary part of the complex permittivity of the porous framework in addition to the refractive index or the real part of the complex permittivity of the porous framework.

In the example described above, MOF-74 (Zn) was used as the porous framework, and in addition, similar results were obtained when MOF-74 (Mg), ZIF-8, UiO-66, and the like were used as the porous framework. MOF-74 (Mg) is the metal organic framework having a pore structure of a honeycomb structure by linking benzene rings as cross-linkable organic ligands and Mg ions by coordinate bonds.

ZIF-8 is a zeolitic imidazolate framework (ZIF), which is a type of the metal organic framework, and is prepared from metal ions and imidazolate anions. UiO-66 is a type of the metal organic framework prepared from $ZrCl_4$ and p-benzenedicarboxylic acid ($H_2$ benzene-1,4-dicarboxylate). Similar results were obtained for other types of porous frameworks.

In the present embodiment, the porous framework is irradiated with the terahertz wave, and the measurement of the refractive index or the real part of the complex permittivity of the porous framework is performed based on the terahertz wave which interacted with the porous framework. Further, the evaluation of the adsorption of the substance on the porous framework is performed based on the measured value of the refractive index or the real part of the complex permittivity of the porous framework. Therefore, it is also possible to simultaneously evaluate presence or absence, a type and an amount of the substance being adsorbed on the porous framework.

Further, the problem of the specific surface area/pore distribution measurement by the gas adsorption method can be solved, the real time evaluation of the adsorption is possible, and further, the evaluation of the adsorption phenomenon in the liquid is also possible. In addition, compared with the adsorption evaluation based on the absorption of the terahertz wave in the porous framework, it is possible to evaluate the adsorption phenomenon of the substance onto the porous framework more accurately.

The adsorption evaluation apparatus and the adsorption evaluation method are not limited to the embodiments and configuration examples described above, and various modifications are possible.

The adsorption evaluation apparatus of a first aspect according to the above embodiment is an apparatus for evaluating adsorption of a substance on a porous framework, and includes (1) a measurement unit for irradiating the porous framework with a terahertz wave, and performing measurement of a refractive index or a real part of a complex permittivity of the porous framework based on the terahertz wave which interacted with the porous framework; and (2) an evaluation unit for performing evaluation of the adsorption of the substance on the porous framework based on the refractive index or the real part of the complex permittivity of the porous framework measured by the measurement unit.

In the adsorption evaluation apparatus of a second aspect, in the configuration of the first aspect, the evaluation unit may perform the evaluation for any one or more of presence or absence, a type, and an amount of the substance adsorbed on the porous framework.

In the adsorption evaluation apparatus of a third aspect, in the configuration of the first or second aspect, the measurement unit may perform the measurement at each of a plurality of measurement timings in a change process of the adsorption of the substance on the porous framework, and the evaluation unit may perform the evaluation at each of the plurality of measurement timings based on the refractive index or the real part of the complex permittivity of the porous framework measured at each of the plurality of measurement timings.

In the adsorption evaluation apparatus of a fourth aspect, in the configuration of the third aspect, the evaluation unit may perform the evaluation of a temporal change of the adsorption of the substance on the porous framework based on the refractive index or the real part of the complex permittivity of the porous framework measured at each of the plurality of measurement timings.

In the adsorption evaluation apparatus of a fifth aspect, in the configuration of the third aspect, the measurement unit may perform the measurement at each of the plurality of measurement timings in the change process of the adsorption of the substance on the porous framework in a state in which the porous framework is disposed in an environment containing the substance.

In the adsorption evaluation apparatus of a sixth aspect, in the configuration of any one of the first to fifth aspects, the measurement unit may perform the measurement in a state in which the porous framework is immersed in a liquid sample obtained by dispersing or dissolving the substance in a liquid medium.

In the adsorption evaluation apparatus of a seventh aspect, in the configuration of any one of the first to sixth aspects, the measurement unit may perform the measurement by using attenuated total reflection spectroscopy.

In the adsorption evaluation apparatus of an eighth aspect, in the configuration of any one of the first to seventh aspects, the measurement unit may perform measurement of an absorption coefficient or an imaginary part of the complex permittivity of the porous framework in addition to the measurement of the refractive index or the real part of the complex permittivity of the porous framework based on the terahertz wave which interacted with the porous framework, and the evaluation unit may perform the evaluation of the adsorption of the substance on the porous framework based on the absorption coefficient or the imaginary part of the complex permittivity of the porous framework in addition to the refractive index or the real part of the complex permittivity of the porous framework measured by the measurement unit.

In the adsorption evaluation apparatus of a ninth aspect, in the configuration of any one of the first to eighth aspects, the porous framework may be any one of a metal organic framework, a covalent organic framework, a hydrogen-bonded organic framework, a porous aromatic framework, and a prussian blue.

The adsorption evaluation method of a first aspect according to the above embodiment is a method for evaluating adsorption of a substance on a porous framework, and includes (1) a measurement step of irradiating the porous framework with a terahertz wave, and performing measurement of a refractive index or a real part of a complex permittivity of the porous framework based on the terahertz wave which interacted with the porous framework; and (2) an evaluation step of performing evaluation of the adsorption of the substance on the porous framework based on the refractive index or the real part of the complex permittivity of the porous framework measured in the measurement step.

In the adsorption evaluation method of a second aspect, in the configuration of the first aspect, in the evaluation step, the evaluation may be performed for any one or more of presence or absence, a type, and an amount of the substance adsorbed on the porous framework.

In the adsorption evaluation method of a third aspect, in the configuration of the first or second aspect, in the measurement step, the measurement may be performed at each of a plurality of measurement timings in a change process of the adsorption of the substance on the porous framework, and in the evaluation step, the evaluation may be performed at each of the plurality of measurement timings based on the refractive index or the real part of the complex permittivity of the porous framework measured at each of the plurality of measurement timings.

In the adsorption evaluation method of a fourth aspect, in the configuration of the third aspect, in the evaluation step, the evaluation of a temporal change of the adsorption of the substance on the porous framework may be performed based on the refractive index or the real part of the complex permittivity of the porous framework measured at each of the plurality of measurement timings.

In the adsorption evaluation method of a fifth aspect, in the configuration of the third aspect, in the measurement step, the measurement may be performed at each of the plurality of measurement timings in the change process of the adsorption of the substance on the porous framework in a state in which the porous framework is disposed in an environment containing the substance.

In the adsorption evaluation method of a sixth aspect, in the configuration of any one of the first to fifth aspects, in the measurement step, the measurement may be performed in a state in which the porous framework is immersed in a liquid sample obtained by dispersing or dissolving the substance in a liquid medium.

In the adsorption evaluation method of a seventh aspect, in the configuration of any one of the first to sixth aspects, in the measurement step, the measurement may be performed by using attenuated total reflection spectroscopy.

In the adsorption evaluation method of an eighth aspect, in the configuration of any one of the first to seventh aspects, in the measurement step, measurement of an absorption coefficient or an imaginary part of the complex permittivity of the porous framework may be performed in addition to the measurement of the refractive index or the real part of the complex permittivity of the porous framework based on the terahertz wave which interacted with the porous framework, and in the evaluation step, the evaluation of the adsorption of the substance on the porous framework may be performed based on the absorption coefficient or the imaginary part of the complex permittivity of the porous framework in addition to the refractive index or the real part of the complex permittivity of the porous framework measured in the measurement step.

In the adsorption evaluation method of a ninth aspect, in the configuration of any one of the first to eighth aspects, the porous framework may be any one of a metal organic framework, a covalent organic framework, a hydrogen-bonded organic framework, a porous aromatic framework, and a prussian blue.

The present invention can be used as an adsorption evaluation apparatus and an adsorption evaluation method capable of more accurately evaluating an adsorption phenomenon of a substance onto a porous framework.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An adsorption evaluation apparatus for evaluating adsorption of a substance on a porous framework, the apparatus comprising:

a measurement unit configured to irradiate the porous framework with a terahertz wave, and perform measurement of a refractive index of the porous framework based on the terahertz wave which interacted with the porous framework; and an evaluation unit configured to perform evaluation of the adsorption of the substance on the porous framework based on the refractive index of the porous framework measured by the measurement unit, wherein the porous framework is any one of a metal organic framework, a covalent organic framework, a hydrogen-bonded organic framework, a porous aromatic framework, and a prussian blue, and the evaluation unit is configured to perform the evaluation for an adsorption amount of the substance adsorbed on the porous framework using a calibration curve representing a relationship between the adsorption amount of the substance and the refractive index of the porous framework.

2. The adsorption evaluation apparatus according to claim 1, wherein the evaluation unit is configured to further perform the evaluation for any one or more of presence or absence, and a type of the substance adsorbed on the porous framework.

3. The adsorption evaluation apparatus according to claim 1, wherein the measurement unit is configured to perform the measurement at each of a plurality of measurement timings in a change process of the adsorption of the substance on the porous framework, and the evaluation unit is configured to perform the evaluation at each of the plurality of measurement timings based on the refractive index of the porous framework measured at each of the plurality of measurement timings.

4. The adsorption evaluation apparatus according to claim 3, wherein the evaluation unit is configured to perform the evaluation of a temporal change of the adsorption of the substance on the porous framework based on the refractive index of the porous framework measured at each of the plurality of measurement timings.

5. The adsorption evaluation apparatus according to claim 3, wherein the measurement unit is configured to perform the measurement at each of the plurality of measurement timings in the change process of the adsorption of the substance on the porous framework in a state in which the porous framework is disposed in an environment containing the substance.

6. The adsorption evaluation apparatus according to claim 1, wherein the measurement unit is configured to perform the measurement in a state in which the porous framework is immersed in a liquid sample obtained by dispersing or dissolving the substance in a liquid medium.

7. The adsorption evaluation apparatus according to claim 1, wherein the measurement unit is configured to perform the measurement by attenuated total reflection spectroscopy.

8. The adsorption evaluation apparatus according to claim 1, wherein the measurement unit is configured to perform measurement of an absorption coefficient or an imaginary part of the complex permittivity of the porous framework in addition to the measurement of the refractive index of the porous framework based on the terahertz wave which interacted with the porous framework, and the evaluation unit is configured to perform the evaluation of the adsorption of the substance on the porous framework based on the absorption coefficient or the imaginary part of the complex permittivity of the porous framework in addition to the refractive index of the porous framework measured by the measurement unit.

9. An adsorption evaluation method for evaluating adsorption of a substance on a porous framework, the method comprising:

a measurement step of irradiating the porous framework with a terahertz wave, and performing measurement of a refractive index of the porous framework based on the terahertz wave which interacted with the porous framework; and an evaluation step of performing evaluation of the adsorption of the substance on the porous framework based on the refractive index of the porous framework measured in the measurement step, wherein the porous framework is any one of a metal organic framework, a covalent organic framework, a hydrogen-bonded organic framework, a porous aromatic framework, and a prussian blue, and in the evaluation step, the evaluation is performed for an adsorption amount of the substance adsorbed on the porous framework using a calibration curve representing a relationship between the adsorption amount of the substance and the refractive index of the porous framework.

10. The adsorption evaluation method according to claim 9, wherein in the evaluation step, the evaluation is further performed for any one or more of presence or absence, and a type of the substance adsorbed on the porous framework.

11. The adsorption evaluation method according to claim 9, wherein in the measurement step, the measurement is performed at each of a plurality of measurement timings in a change process of the adsorption of the substance on the porous framework, and in the evaluation step, the evaluation is performed at each of the plurality of measurement timings based on the refractive index of the porous framework measured at each of the plurality of measurement timings.

12. The adsorption evaluation method according to claim 11, wherein in the evaluation step, the evaluation of a temporal change of the adsorption of the substance on the porous framework is performed based on the refractive index of the porous framework measured at each of the plurality of measurement timings.

13. The adsorption evaluation method according to claim 11, wherein in the measurement step, the measurement is performed at each of the plurality of measurement timings in the change process of the adsorption of the substance on the porous framework in a state in which the porous framework is disposed in an environment containing the substance.

14. The adsorption evaluation method according to claim 9, wherein in the measurement step, the measurement is performed in a state in which the porous framework is immersed in a liquid sample obtained by dispersing or dissolving the substance in a liquid medium.

15. The adsorption evaluation method according to claim 9, wherein in the measurement step, the measurement is performed by attenuated total reflection spectroscopy.

16. The adsorption evaluation method according to claim 9, wherein in the measurement step, measurement of an absorption coefficient or an imaginary part of the complex permittivity of the porous framework is performed in addition to the measurement of the refractive index of the porous framework based on the terahertz wave which interacted with the porous framework, and in the evaluation step, the evaluation of the adsorption of the substance on the porous framework is performed based on the absorption coefficient or the imaginary part of the complex permittivity of the porous framework in addition to the refractive index of the porous framework measured in the measurement step.

* * * * *